(12) United States Patent
Blanco et al.

(10) Patent No.: US 8,850,196 B2
(45) Date of Patent: Sep. 30, 2014

(54) METHODS FOR AUTHENTICATION USING NEAR-FIELD

(75) Inventors: Alejandro G. Blanco, Davie, FL (US); George S. Hanna, Miami, FL (US); John B. Preston, Plantation, FL (US); Mark Boerger, Plantation, FL (US)

(73) Assignee: Motorola Solutions, Inc., Schaumburg, IL (US)

( * ) Notice: Subject to any disclaimer, the term of this patent is extended or adjusted under 35 U.S.C. 154(b) by 735 days.

(21) Appl. No.: 12/748,982

(22) Filed: Mar. 29, 2010

(65) Prior Publication Data

US 2011/0238995 A1 Sep. 29, 2011

(51) Int. Cl.
*H04L 9/32* (2006.01)
*H04L 29/06* (2006.01)
*H04W 12/06* (2009.01)
*H04W 92/18* (2009.01)

(52) U.S. Cl.
CPC .............. *H04W 12/06* (2013.01); *H04W 92/18* (2013.01); *H04L 63/0492* (2013.01); *H04L 63/18* (2013.01); *H04L 63/0853* (2013.01)
USPC ................................ 713/168; 380/270; 726/9

(58) Field of Classification Search
CPC .. H04W 12/06; H04W 92/18; H04L 63/0492; H04L 63/0853; H04L 63/18
USPC .................. 713/172, 173, 185, 168; 726/2, 4, 726/20–21, 9; 380/44, 247, 270; 708/250
See application file for complete search history.

(56) References Cited

U.S. PATENT DOCUMENTS

| | | | |
|---|---|---|---|
| 6,876,643 B1 | 4/2005 | Aggarwal et al. | |
| 7,243,231 B2 * | 7/2007 | Ellison et al. | 713/168 |
| 7,392,387 B2 | 6/2008 | Balfanz et al. | |
| 7,716,483 B2 | 5/2010 | Sozzani et al. | |
| 7,925,022 B2 | 4/2011 | Jung et al. | |
| 8,041,339 B2 | 10/2011 | Teunissen et al. | |
| 8,090,945 B2 | 1/2012 | Singhal | |

(Continued)

FOREIGN PATENT DOCUMENTS

| | | |
|---|---|---|
| CN | 1473310 A | 2/2004 |
| EP | 1802155 A1 | 6/2007 |

(Continued)

OTHER PUBLICATIONS

PCT Communication Relating to the Results of the Partial International Search Dated Mar. 15, 2011.

(Continued)

*Primary Examiner* — Samson Lemma
(74) *Attorney, Agent, or Firm* — Steven A. May

(57) ABSTRACT

Authentication methods are used to authenticate, a device1 having an ESN1 (electronic serial number), a device2 having an ESN2, and/or a user of the devices. In one implementation, device1 receives the ESN2 in a near-field signal; derives an authentication result as a function of the ESN1 and ESN2; and sends the authentication result to an authenticator device to use in completing authentication. Authentication is confirmed when the device1 authentication result matches an authentication result independently generated by the authenticator device, which is provisioned with the ESN1 and ESN2. In a second implementation, device1 generates a RAND1 (random number) and sends the RAND1 to device2 over a near-filed link. An authenticator device confirms authentication upon receiving the same RAND1 from both device1 and device2.

14 Claims, 7 Drawing Sheets

(56) References Cited

U.S. PATENT DOCUMENTS

| | | |
|---|---|---|
| 8,141,134 B2 | 3/2012 | Brandt et al. |
| 8,161,172 B2 | 4/2012 | Reisman |
| 8,201,231 B2 | 6/2012 | Williams et al. |
| 8,205,247 B2 | 6/2012 | Lexcellent et al. |
| 8,220,035 B1 | 7/2012 | Pravetz et al. |
| 8,327,427 B2 | 12/2012 | Soukup et al. |
| 2001/0041531 A1 | 11/2001 | Haight et al. |
| 2003/0026433 A1 | 2/2003 | Matt |
| 2003/0159072 A1 | 8/2003 | Bellinger et al. |
| 2004/0097217 A1 | 5/2004 | McClain |
| 2005/0198204 A1 | 9/2005 | Takahashi |
| 2005/0221813 A1 | 10/2005 | Rajahalme et al. |
| 2005/0266826 A1* | 12/2005 | Vlad .............................. 455/410 |
| 2006/0083208 A1 | 4/2006 | Lin |
| 2006/0293028 A1 | 12/2006 | Gadamsetty et al. |
| 2007/0019616 A1 | 1/2007 | Rantapuska et al. |
| 2007/0022301 A1 | 1/2007 | Nicholson et al. |
| 2007/0194931 A1 | 8/2007 | Miller et al. |
| 2007/0202807 A1 | 8/2007 | Kim |
| 2007/0203850 A1 | 8/2007 | Singh et al. |
| 2007/0236586 A1 | 10/2007 | Ryckman |
| 2007/0254709 A1 | 11/2007 | Higgins |
| 2007/0264976 A1 | 11/2007 | Lessing et al. |
| 2008/0083708 A1 | 4/2008 | Hussary et al. |
| 2008/0120711 A1 | 5/2008 | Dispensa |
| 2008/0172341 A1 | 7/2008 | Crandell |
| 2008/0198018 A1 | 8/2008 | Hartley |
| 2008/0222711 A1 | 9/2008 | Michaelis |
| 2008/0268776 A1 | 10/2008 | Amendola |
| 2008/0278329 A1 | 11/2008 | Kim et al. |
| 2008/0320190 A1 | 12/2008 | Lydon et al. |
| 2008/0320587 A1* | 12/2008 | Vauclair et al. .................. 726/17 |
| 2009/0070472 A1 | 3/2009 | Baldus et al. |
| 2009/0083378 A1 | 3/2009 | Lingafelt et al. |
| 2009/0202079 A1 | 8/2009 | Puputti et al. |
| 2009/0249478 A1 | 10/2009 | Rosener et al. |
| 2009/0287922 A1 | 11/2009 | Herwono et al. |
| 2010/0005294 A1 | 1/2010 | Kostiainen et al. |
| 2010/0088390 A1 | 4/2010 | Bai et al. |
| 2010/0145860 A1 | 6/2010 | Pelegero |
| 2011/0028091 A1 | 2/2011 | Higgins et al. |
| 2011/0028125 A1* | 2/2011 | Dehlinger et al. ............ 455/411 |
| 2011/0030044 A1 | 2/2011 | Kranendonk et al. |
| 2011/0136470 A1 | 6/2011 | Kurz |
| 2011/0167126 A1 | 7/2011 | Yim et al. |
| 2011/0212688 A1 | 9/2011 | Griffin et al. |
| 2011/0282960 A1 | 11/2011 | Lin |
| 2012/0072503 A1 | 3/2012 | Kowalewski |
| 2012/0084364 A1 | 4/2012 | Sivavakeesar |
| 2012/0084565 A1 | 4/2012 | Wittenberg et al. |
| 2012/0117626 A1 | 5/2012 | Yates et al. |
| 2012/0144202 A1 | 6/2012 | Counterman |
| 2012/0179789 A1 | 7/2012 | Griot et al. |
| 2013/0018975 A1 | 1/2013 | Higgins |

FOREIGN PATENT DOCUMENTS

| | | |
|---|---|---|
| EP | 2068597 A1 | 6/2009 |
| EP | 2456245 A1 | 5/2012 |
| GB | 2365699 A * | 2/2002 |
| GB | 2478653 A | 9/2011 |
| WO | 2002021429 A2 | 3/2002 |
| WO | 2005119931 A1 | 12/2005 |
| WO | WO2006027725 A1 | 3/2006 |
| WO | 2006067281 A1 | 6/2006 |
| WO | 2007107708 A2 | 9/2007 |
| WO | 2009044228 A2 | 4/2009 |
| WO | 2009066212 A1 | 5/2009 |
| WO | WO2009058494 A1 | 5/2009 |
| WO | 2009070430 A2 | 6/2009 |
| WO | 2009095048 A1 | 8/2009 |
| WO | 2009104131 A1 | 8/2009 |
| WO | 2009133419 A1 | 11/2009 |
| WO | 2009140170 A1 | 11/2009 |
| WO | 2011062726 A1 | 5/2011 |

OTHER PUBLICATIONS

PCT International Search Report Dated Jun. 27, 2011.

PCT International Search Report Dated Oct. 22, 2010 for Related U.S. Appl. No. 12/748,982.

D. Sharmila, et al. "Bluetooth Man-In-The-Middle Attack Based on Secure Simple Pairing Using Out of Band Association Model", International Conference on "Control, Automation, Communication and Energy Conservation" Jun. 2009; pp. 1-6.

International Preliminary Report on Patentability and Written Opinion for related International application No. PCT/US2010/061217 dated Oct. 2, 2012.

"Otway-Rees protocol," Wikipedia, accessed at http://en.wikipedia.org/wiki/Otway%E2%80%93Rees_protocol, 2 pages, accessed on Sep. 11, 2013.

"SAML V2.0 Holder-of-Key Web Browser SSO Profile Version 1.0," accessed at http://docs.oasis-open.org/security/saml/Post2.0/sstc-saml-holder-of-key-browser-sso.pdf, Aug. 10, 2010, 24 pages.

Bradley, J. et al.,"The OAuth 2.0 Authorization Framework: Holder-of-the-Key Token Usage draft-tschofenig-oauth-hotk-01.txt," Network Working Group, Internet-Draft, pp. 23, Jul. 16, 2012.

Farrell, S. et al., "An Internet Attribute Certificate Profile for Authorization," Network Working Group, RFC 3281, pp. 1-41, Apr. 2002.

Final Office Action mailed Sep. 13, 2012 in related U.S. Appl. No. 12/534,246, Robert J. Higgins, filed Aug. 3, 2009.

Housley, R. et al., "Internet X.509 Public Key Infrastructure Certificate and Certificate Revocation List (CRL) Profile," Network Working Group, RFC 3280, pp. 1-130, Apr. 2002.

International Search Report and Written Opinion for related International Patent Application No. PCT/US2012/046014 mailed on Oct. 11, 2012.

Non Final Office Action mailed Apr. 9, 2012 in related U.S. Appl. No. 12/534,246, Robert J. Higgins, filed Aug. 3, 2009.

Non Final Office Action mailed on Jun. 24, 2013 in related U.S. Appl. No. 13/183,930, Robert J Higgins, filed Jul. 15, 2011.

Madsen, P., "Liberty ID-WSF Multi-Device SSO Deployment Guide," Version: 1.0-02, Liberty Alliance Project, pp. 1-13, 2008.

"BUMP (application)" accessed at wikipedia.com on Jan. 24, 2012, last modified on Jan. 17, 2013, 3 pages.

Final Office Action mailed Oct. 16, 2013 in U.S. Appl. No. 13/183,930, Robert J. Higgins, filed Jul. 15, 2011.

Office Action for European Patent Application No. 10738091.7 mailed Nov. 6, 2013.

Tuecke, S., et al., "Internet X.509 Public Key Infrastructure (PKI) Proxy Certificate Profile," Network Working Group, RFC 3820, Jun. 2004, pp. 1-37.

Novotny L and Hecht B., "Principles of Nano-Optics: Theoretical foundations," Cambridge University Press, Chapter 2, 2006, pp. 13-44.

"Performance of RFID Tags in Near and Far Field", Flores, etc., Personal Wireless Communications, 2005. ICPWC 2005 IEEE International Conference on, Jan. 23-25, 2005, pp. 353-357.

Assertions and Protocols for the Oasis Security Assertion Markup Language (SAML) V2.0; Oasis Standard, Mar. 15, 2005; 86 pages; Editors Scott Cantor, et al.

Australian Patent Examination Report No. 1 issued on Jul. 1, 2013 in Australian Patent Application No. 2010281501.

Australian Patent Examination Report No. 2 issued on Aug. 23, 2013 in Australian Patent Application No. 2010281501.

Australian Patent Examination Report No. 1 issued on Sep. 6, 2013 in Australian Patent Application No. 2010349709.

Canadian Office Action mailed on Sep. 27, 2013 in Canadian Patent Application No. 2769331.

Chinese Office Action issued on Dec. 10, 2013 in Chinese Patent Application No. 201080034505.x.

Hocking C.G., et al. "A Distributed and Cooperative User Authentication Framework", Information Assurance and Security (IAS), 2010 Sixth International Confeence on, IEEE, Aug. 23, 2010, pp. 304-310, XP031777197, ISBN:978-1-4244-7407-3.

(56) References Cited

OTHER PUBLICATIONS

Jeffrey Fischer. "NFC in cell phones: The new paradigm for an interactive world". Communications Magazine, IEEE, vol. 47, No. 6, pp. 22-28, Jun. 2009.

Lishoy Francis, Gerhard Hancke, Keith Mayes, and Konstantinos Markantonakis, "Practical NFC Peer-to-Peer Relay Attackv Using Mobile Phones," in RFI DSec'1 0 Proceedings of the 6th international conference on Radio frequency identification: security and privacy issues, Istanbul, Turkey, Jun. 8-9, 2010. pp. 35-49.

Marc Barish "Design and Evaluation of an Architecture for Ubiquitous User Authentication Based on Identity Management Systems", Trust, Security and Privacy in Computing and Communicatiions (TRUSTCOM), 2011 IEEE 10TH International Conference on, Nov. 16, 2011, pp. 863-872, XP032086891, D01:10.1109/TRUSTCOM.2011.116, ISBN:978-1-4577-2135-9.

Non Final Office Action mailed on Apr. 22, 2014 in related U.S. Appl. No. 13/183,930, Robert J Higgins, filed Jul. 15, 2011.

PCT International Search Report Dated Mar. 14, 2014 for Counterpart Application PCT/US2013/071850.

Yih-chun Hu, Adrian Perrig, and David B. Johnson, "Wormhole attacks in wireless networks". In IEEE Journal on SelectedAreas in Communications vol. 24. Published 2006 (month unknown). pp. 370-380.

Australian Patent Examination Report No. 2 issued on Jun. 11, 2014 in Australian Patent Application No. 2010349709.

Korean Preliminary Rejection issued Jun. 19, 2014 in corresponding Korean Patent Application No. 10-2012-7028109.

\* cited by examiner

METHODS FOR AUTHENTICATION USING NEAR-FIELD

REFERENCE TO RELATED APPLICATIONS

The present application is related to the following U.S. applications commonly owned together with this application by Motorola, Inc.:

Ser. No. 12/534,246, filed Aug. 3, 2009, titled "Method and System for Near-field Wireless Device Pairing" by Higgins, et al.

TECHNICAL FIELD

The technical field relates generally to user or device authentication and more particularly to authentication using a near field technique.

BACKGROUND

In many communication scenarios, it is desirable to authenticate or verify the identity of a person and/or a device before allowing access to a network or service. The most common user authentication is to require a login and password. This method has the difficulties of the user having to remember and enter this information. Further compounding the problem, a majority of the radios being used today in public safety have no keypad, display, or other graphical user interface (GUI). Thus, for some radios, a very limited user interface or even no user interface is present to facilitate the authentication process.

The user login and password method is also susceptible to spoofing if the user information is acquired by unauthorized persons. For this reason, this method is sometimes augmented with a second factor for authentication, such as a seeded card that gives other information to enter. Due to these limitations associated with the user login and password method, it would be desirable to have a strong authentication method that does not require the user to input a password or other information to complete the authentication process.

Thus, there exists a need for a method and system for authentication using near field techniques and/or mechanisms.

BRIEF DESCRIPTION OF THE FIGURES

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

Figure 1:
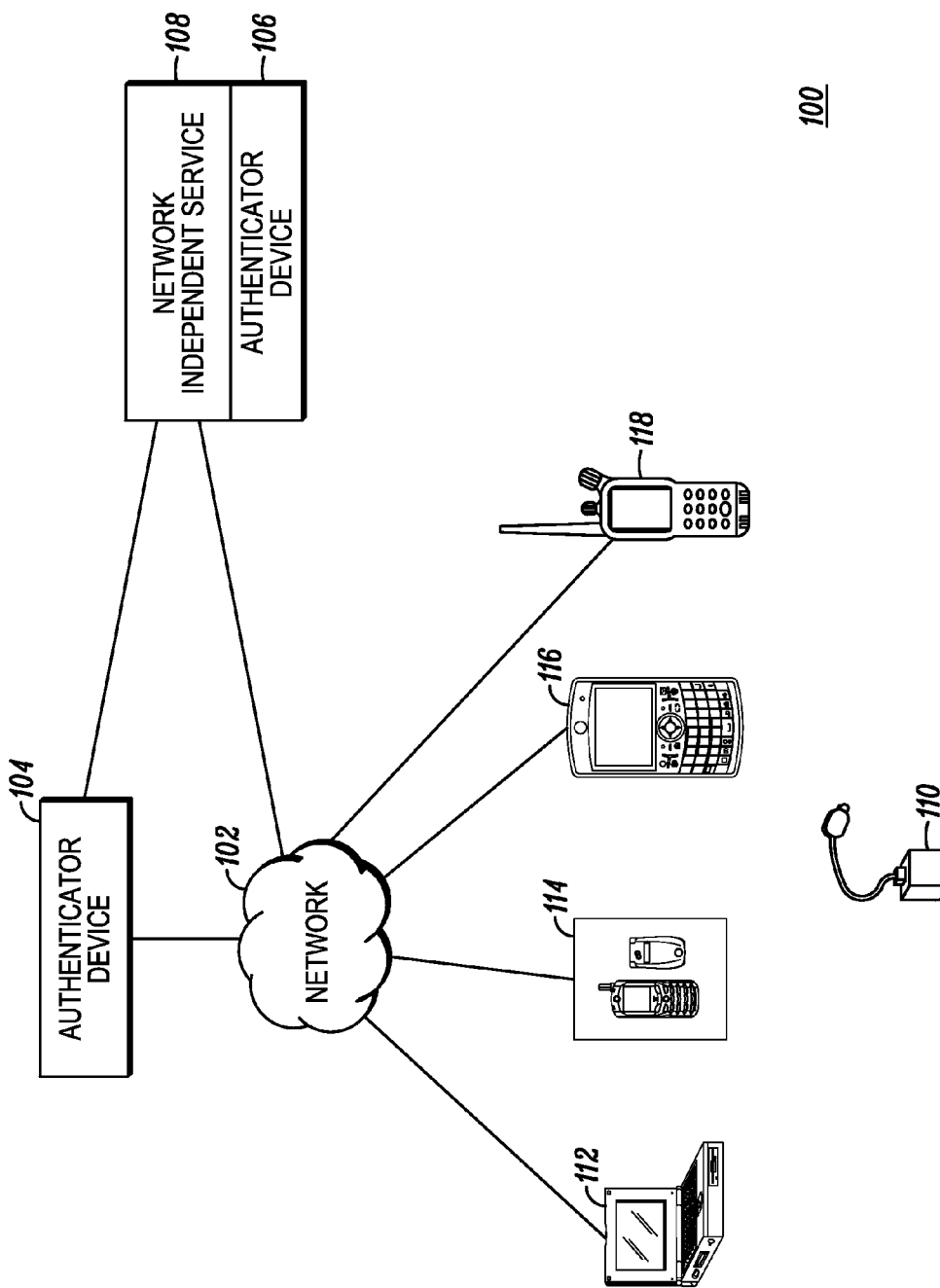
FIG. 1 is a pictorial diagram illustrating a communication system in which authentication methods are implemented in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments. In addition, the description and drawings do not necessarily require the order illustrated. It will be further appreciated that certain actions and/or steps may be described or depicted in a particular order of occurrence while those skilled in the art will understand that such specificity with respect to sequence is not actually required. Apparatus and method components have been represented where appropriate by conventional symbols in the drawings, showing only those specific details that are pertinent to understanding the various embodiments so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

DETAILED DESCRIPTION

Generally speaking, pursuant to one embodiment, a first device of a user has a first electronic serial number (ESN) and receives a second ESN from a second device of the user, wherein the second ESN is received in a near-field signal. The first device derives an authentication result as a function of at least one of the first or second ESNs and sends the authentication result to an authenticator device to use in authenticating at least one of the first device, the second device, or the user of the first and second devices. This embodiment can be used in conjunction with authentication procedures as described in the Project 25 or APCO-25 (referred to herein as APCO) suite of standards for digital radio communications.

Pursuant to another embodiment, a first device of a user generates a random number and sends the random number to a second device of the user over a near-field link. The first device further sends the random number to an authenticator device, wherein at least one of the first device, the second device, or the user of the first and second devices is authenticated upon the authenticator device receiving the same random number from both the first and second devices.

Benefits of implementing the disclosed embodiments include: the authentication methods in accordance with the teachings herein do not require user input of a password or other login information (although if desired the disclosed methods can be used as a second factor in authentication on top of a login or password) and is, therefore, compatible even with radios having no display, keyboard, or other GUI; the low frequency non-propagating signal, used in one illustrative implementation, is easy to generate, supplies close range communications at low power, and is so far below the frequencies for the electromagnetic signals used in most radios and other wireless communication devices that interference with these is minimized or non-existent; and the non-propagating signal, used in one illustrative implementation, is fundamentally secure because the propagation law for this technology is $1/r^6$ instead of $1/r^2$ for normal propagating radio signals—basically, after a short distance the signal strength falls so steeply as to be below the thermal noise floor and is thus hidden from surreptitious reception. Those skilled in the art will realize that the above recognized advantages and other advantages described herein are merely illustrative and are not meant to be a complete rendering of all of the advantages of the various embodiments.

Referring now to the drawings, and in particular FIG. 1, a pictorial diagram illustrating a communication system implementing authentication methods in accordance with some embodiments is shown and indicated generally at 100. System 100 includes a number of illustrative communication devices, e.g., an earpiece 110, a laptop 112, a cellular telephone 114, a personal data assistant (PDA) 116, and a land mobile radio 118, two or more of which are operated by a user and are, therefore, termed "user" or "subscriber" devices. The teachings herein are directed to methods for authenticating a user of two or more such devices and/or one or more of the devices. Such methods, for instance as described below by reference to FIGS. 4-7, can be implemented in a variety of use case scenarios, two of which are described below by way of illustration.

In one example use case scenario, the user desires to collaboratively use two devices, and operate at least one of the two devices over a network 102, of system 100, to communicate with one or more other devices (not shown). For instance, the user may use an accessory such as the earpiece 110 with one of the devices 112, 114, 116, or 118 while operating the device over network 102; or the user may collaboratively use the PDA 116 and radio 118 to communicate voice and data over the network 102. In such a case, one or more of the devices 112, 114, 116, or 118 may be required to authenticate to the network 102 via an authenticator device 104 before being allowed to access the network.

In another example use case scenario, the user of multiple ones of the devices 110, 112, 114, 116, and 118 may desire to use a service, such as a network independent service 108, and may, thereby, be required to authenticate his or her identity via an authenticator device, e.g., 106. For instance, the network independent service can be access to national, regional, or state databases that require user identification and validation for access. However, access to any service is covered under this use case scenario.

Turning back to the elements of system 100, the user devices 110, 112, 114, 116, and 118 can be any type of device such as those provided by way of illustration in FIG. 1 or any other type of subscriber device with wireless and near-field capabilities. The authenticator devices 104 and 106 can be any device that implements methods and protocols consistent with the teachings herein for facilitating user and/or device authentication. In one illustrative implementation, the authenticator device is a server, such as an authentication, authorization, and accounting (AAA) server having memory, a processor, and a suitable wired and/or wireless interface operatively coupled for communicating with one or more of the devices 112, 114, 116, or 118.

Network 102 can be any type of communication network, wherein the user devices communicate with infrastructure devices in the network using any suitable over-the-air protocol and modulation scheme. Although not shown, network 102 comprises a number of infrastructure devices for a commercial embodiment that are commonly referred to as, but not limited to, bridges, switches, zone controllers, base station controllers, repeaters, base radios, base transceiver stations, access points, routers, authentication centers, or any other type of infrastructure equipment facilitating communications between entities in a wireless or wired environment. Finally, it should be noted that system 100 is illustrated by reference to a limited number of devices for ease of illustration. However, any suitable number of authenticator devices, user devices, networks, and independent services may be implemented in a commercial system without loss of generality of the teachings herein.

Figure 2:
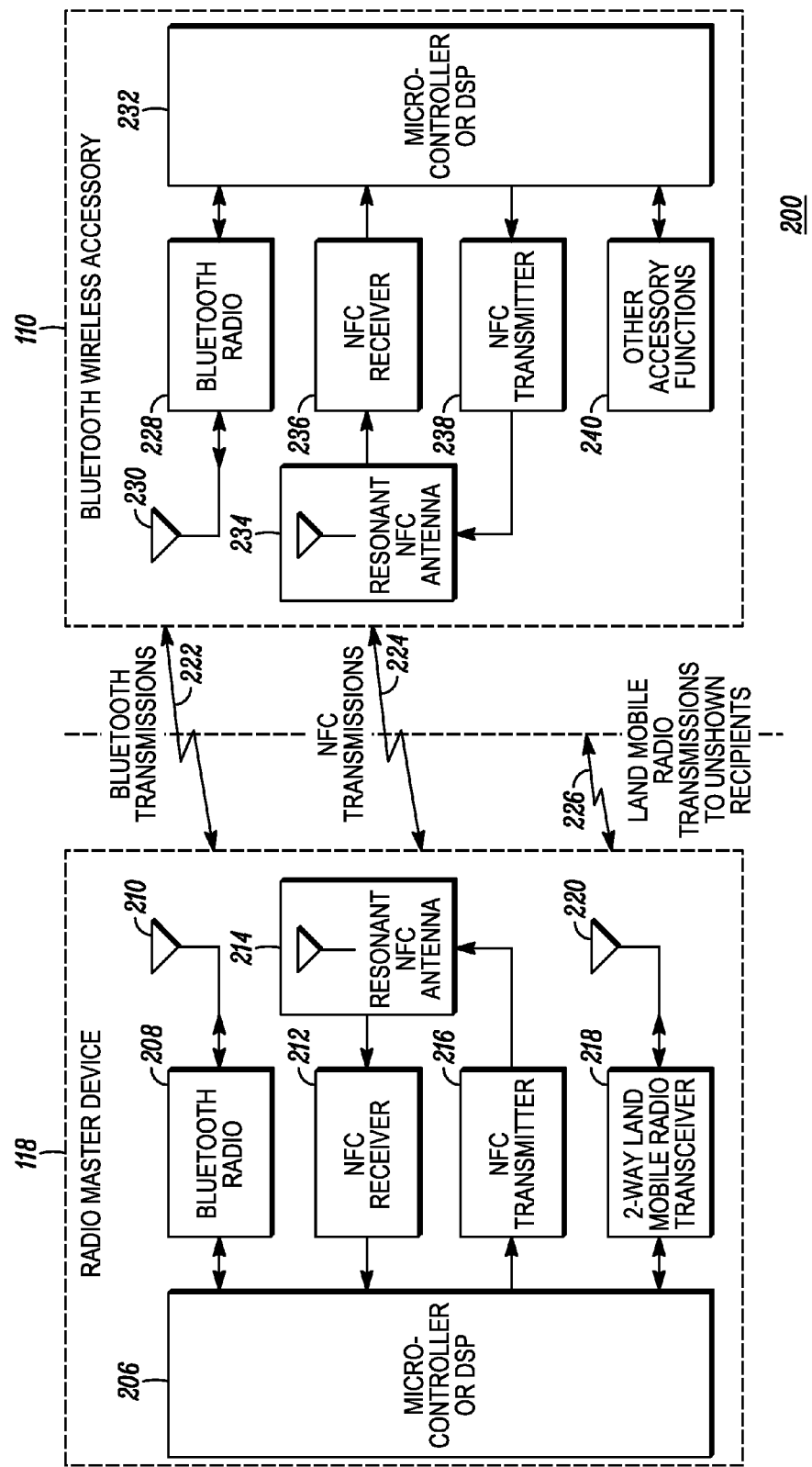
FIG. 2 is a block diagram illustrating a system that includes a radio and accessory that implement authentication methods in accordance with some embodiments.

Turning now to FIG. 2, a block diagram illustrating a system that includes two devices that implement authentication methods in accordance with some embodiments is shown and indicated generally at 200. System 200 includes a first communication device (in this case the radio 118) and a second communication device (in this case the headpiece 110). However, the first and second communication devices can be any type of communication devices operated by a user for which user and/or device authentication is needed, including any of the illustrative user devices shown in FIG. 1.

Device 118 comprises: a microcontroller or digital signal processor (DSP) 206; apparatus for shorter range communications 222 (e.g., 10-100 m or 30-300') using electromagnetic (also know as propagating and "far-field") signals, which in this case is Bluetooth apparatus that includes a Bluetooth radio 208 with a corresponding antenna 210; near-field communication (NFC) apparatus (or simply near-field apparatus) that includes an NFC receiver 212, a resonant NFC antenna 214, and an NFC transmitter 216; and a two-way land mobile radio transceiver 218 with a corresponding antenna 220 for generating long range (over 100 m) electromagnetic signals 226. Device 110 comprises: a microcontroller or DSP 232; corresponding Bluetooth apparatus that includes a Bluetooth radio 228 with a corresponding antenna 230; corresponding near-field apparatus that includes an NFC receiver 236, a resonant NFC antenna 234, and an NFC transmitter 238; and other accessory functions 240 including, but are not limited to, headsets, car audio kits, text display and keyboard devices, handheld computing devices, scanners, printers, and remote control devices. Also, if the second device was other than an accessory (for instance if the second device were the cell phone 114 or the PDA 116), it would further include a corresponding transceiver and antenna similar to the transceiver 218 and antenna 220 of radio 118.

Regarding the types of signals processed in the user devices, a propagating or "far-field" signal is defined as an electromagnetic signal comprising both electric and magnetic field components that is generated by supplying a radio frequency alternating current to an antenna at a transmitting device to generate a signal that self-propagates (i.e., a radiating wave), such that the signal can be successfully received at an antenna at a receiving device at distances of well over two meters. A propagating signal obeys a $1/r^2$ propagating law in unobstructed environments, wherein the signal falls off at a rate of about $1/r^2$ where r is the distance between the transmitting and receiving antennas. Thus, in far-field systems (as opposed to near-field systems) that produce propagating signals, all of the transmission energy is designed to radiate into free space.

Contrast this to a non-propagating signal (also referred to in the art as an evanescent signal) that is defined as a signal having a substantially magnetic field component or a substantially electrical field component but not both, which obeys a $1/r^6$ propagating law, wherein the non-propagating radio signal power falls off at a rate of about $1/r^6$ where r is the distance between the transmitting and receiving antennas. Accordingly, a non-propagating signal is localized to its source by lack of an antenna that can produce a radiating wave. Instead, the antenna used to generate a non-propagating signal (termed herein a NFC "resonant antenna") is so electrically small compared to the wavelength of the exciting signal so as to produce no substantial electromagnetic component but only a local electric or magnetic field in the vicinity of the antenna (the non-propagating component of the signal is on the order of $10^6$ times as big as any propagating component of the signal, if one is present). A non-propagating signal is also referred to herein as a "near-field" signal. Moreover, "near-field apparatus" is used to communicate a near-field signal over a communication path termed herein a "near-field link".

Turning back to the description of the elements of the radio 118 and accessory 110 shown in FIG. 2, controller 206 of user device 118 controls the coordination of the Bluetooth apparatus, the near-field apparatus, and the two-way radio transceiver apparatus for effectuating the corresponding communications using the respective apparatus. Controller 232 of user device 110 controls the coordination of the Bluetooth apparatus, the near-field apparatus, and the other accessory functions for effectuating the corresponding communications using the respective apparatus. Controllers 206 and 232 can be any processing element (such as a digital signal processor) that has suitable processing power and associated memory (not shown) for carrying out the functions for implementing embodiments according to the teachings herein.

Bluetooth radios 208 and 228 establish a link for the Bluetooth transmissions 222 such as voice transmissions between the accessory 110 and the radio 118. The Bluetooth radios 208 and 228 comprise conventional Bluetooth transceivers that implement the Bluetooth protocol in accordance with any one or more of: Bluetooth Specifications 1.1 ratified as IEEE Standard 802.15.1-2002; Bluetooth Specification 1.2 ratified as IEEE Standard 802.15.1-2005; Bluetooth Specification 2.0+EDR (Enhanced Data Rate) released on Nov. 10, 2004; Bluetooth Core Specification 2.1 adopted by the Bluetooth SIG on Jul. 26, 2007; Bluetooth Specification 3.0 adopted by the Bluetooth SIG on Apr. 21, 2009; and/or subsequent Bluetooth Specification releases. In this embodiment, Bluetooth technology is used for the short-range communications, but any suitable technology can be used for the short-range communications including, but not limited to, Zigbee, IEEE 802.11a/b/g (Wi-Fi), Wireless USB, etc.

With further respect to device 118, transceiver 218 and antenna 220 are also conventional elements that, in this illustrative embodiment, implement one or more protocols that enable the transmission and reception of two-way voice media 226 over the air, e.g., via network 102, with other communication devices (not shown). Such protocols may include, but are not limited to, standards specifications for wireless communications developed by standards bodies such as TIA (Telecommunications Industry Association), OMA (Open Mobile Alliance), 3GPP (3rd Generation Partnership Project), 3GPP2 (3rd Generation Partnership Project 2), IEEE (Institute of Electrical and Electronics Engineers) 802, and WiMAX Forum. Moreover, other media such as video may be communicated using the transceiver 218 and antenna 220 depending on the particular user device.

The near-field apparatus in the radio 118 and the accessory 110 (e.g., respectively, elements 212, 214, 216 and 234, 236, 238) are designed as "peer" self-powered devices (as opposed to one device being a passive device, which is not self-powered) that establish a near-field link for communicating near-field transmissions 224. The design of the near-field apparatus generates modulated data signals that are localized around (i.e., within six inches of) the resonant antenna, which provides a large measure of security in transferring data using this technology. In addition, some near-field apparatus embodiments generate such a low frequency signal that it guards against the near-field signal interfering with other media transmissions of the same device or devices in the area.

In one illustrative implementation, the near-field apparatus comprises a microcontroller (which may be incorporated into or separate from controllers 206 and 232, which when programmed with suitable software (code) functions as the near-field transmitter and receiver. As a transmitter, the microcontroller modulates data (e.g., an ESN or a random number) onto a carrier wave for transmission as a non-propagating signal 224 via the near-field resonant antenna. As a receiver, the microcontroller receives from the resonant antenna a non-propagating signal comprising data modulated onto a carrier wave.

The near-field resonant antennas 214, 234 can be implemented with a coil device (such as an inductor) and other complimentary circuitry (e.g., resistors and capacitors) to generate a substantially magnetic field onto which the data is modulated, i.e., the modulated carrier frequency. In one embodiment of the near-field apparatus, the antenna assembly and microprocessor are designed to generate a modulated non-propagating signal centered around 13.56 MHz. Such an embodiment is compatible with NFC standards for peer-to-peer operation, for example, as described in ISO/IEC 18092 NFCIP-1/EMCA-340/ETSI TS 102 190 v1.1.1 (2003-03) and ISO/IEC 21481 NFCIP-2/EMCA-352/ETSI TS 102 312 v1.1.1 (2004-02).

In another embodiment of the near-field apparatus, the antenna assembly and microprocessor are designed to generate a modulated non-propagating signal centered around any suitable "low" frequency, wherein low frequency refers to frequencies of less than 1 MHz. In one example implementation, the antenna assembly includes: a resistor having a value of 270K ohms; a resistor having a value of 150 ohms; a coil device, which in this case is an inductor, having a value of 7.3 millihenry; an antenna resonating capacitor having a value of 220 picofarads; and a bypass capacitor having a value of 1.0 microfarad. This implementation generates a modulated carrier signal that is centered at about an oscillator frequency of about 125 kHz.

Figure 3:
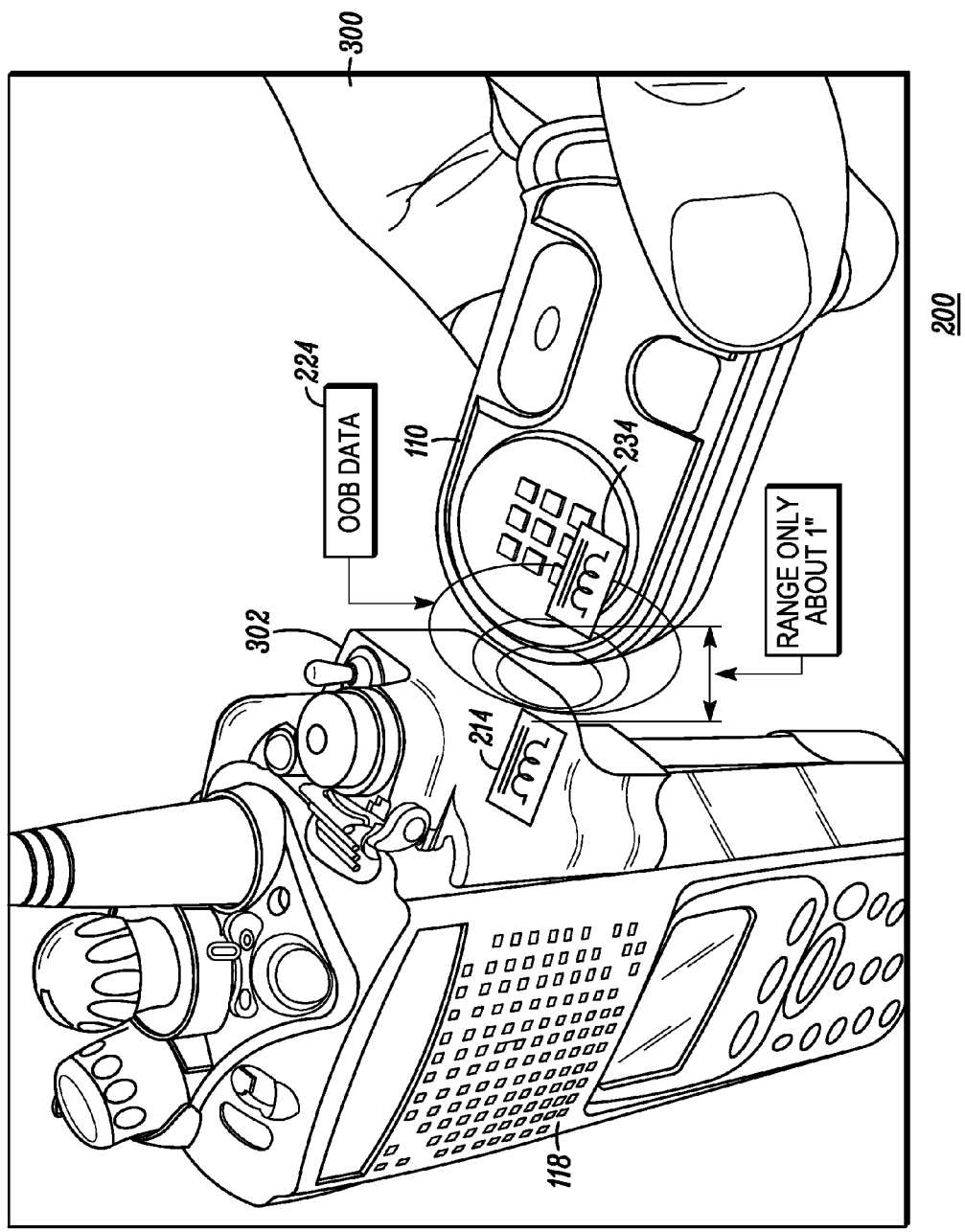
FIG. 3 is a pictorial diagram of the system of FIG. 2 showing resonant antennas used to implement authentication methods in accordance with some embodiments.

FIG. 3 is a pictorial diagram of system 200 showing a user 300 bringing the accessory (110) within about one inch from the radio 118, wherein information is exchanged in a near-field signal over a near-field link to facilitate authentication in accordance with the teachings herein. The OOB data 224, e.g., a random number or ESN as described in detail below, comprises a non-propagating signal that is localized around the resonant antennas 214 (shown as being included in an adaptor 302 on the radio 118) and 234 (in the accessory 110). With the components used in the near-field apparatus described above, the range between the near-field apparatus in the host and accessory is about 2" from antenna to antenna, which leaves enough room for embedding the antennas on the boards within the accessory and within the radio and some room to spare (e.g., the 1 inch) on the outside.

Figure 4:
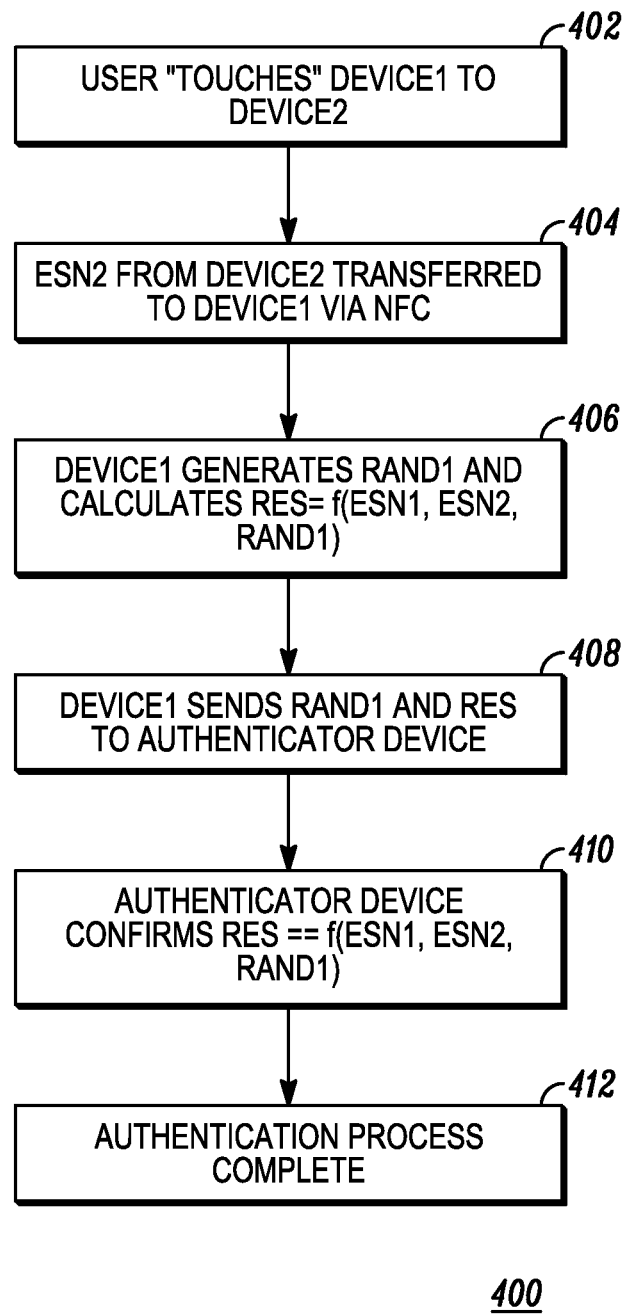
FIG. 4 is a flow diagram illustrating a method of authentication using near field in accordance with an embodiment.

Turning now to the methods for performing authentication in accordance with the disclosed teachings, FIG. 4 is a flow diagram illustrating a method 400 of authentication using near field, in accordance with a first embodiment. The functionality illustrated by reference to method 400 is performed in two devices (e.g., device 118 (also referred to as device1) and device 110 (also referred to as device2), and could be performed concurrently with a pairing procedure between the devices. Devices 1 and 2 are presumably operated by the same user or have a common user due to the close distance required (i.e., six inches or less) in order for data to be transferred in a near-field non-propagating signal over a near-field link between the devices. Moreover, device1 is provisioned with an electronic serial number (ESN1), and device2 is provisioned with an electronic serial number (ESN2). An electronic serial number (ESN) is defined herein as a unique identification number embedded or inscribed on a microchip in a device and which cannot be modified in the field. For instance, wireless phones contain ESNs, and each time a call is placed, the ESN is automatically transmitted to the base station so the wireless carrier's mobile switching office can check the call's validity.

Accordingly, at 402, the user "touches" device1 and device2. "Touching" the devices means that the devices are within range of the field of operation for the near-field signal to be communicated, i.e., between six inches and zero inches (making physical contact). Upon bringing the devices into the required proximity, ESN2 from device2 is transmitted (404) to and received by device1 in a non-propagating near-field signal over the established near-field link. Thus, the ESN2 is communicated using the near-field apparatus in the devices.

Device1 uses the ESN2 individually or uses some combination or function of the ESN1 and ESN2 to determine or calculate (406) an authentication result (RES) to send (408) to the authenticator device (e.g., 104, and/or 106) to use in authenticating device1, device2, and/or the user of the devices. In an embodiment, device1 sends RES in response to an authentication demand from the authenticator device, such as in an implementation compatible with APCO standards (as discussed in further detail below by reference to FIG. 6 and FIG. 7). For instance, the authenticator device sends the authentication demand upon device1 sending a registration request to operate on the network 102 (thus the demand being initiated by device1); or the authentication demand may be initiated by authenticator device (thus the demand being unsolicited by device1). In the second instance, once authentication is successful, the authentication device might periodically challenge authentication (also compatible with APCO standards). This ensures, for example, that an operational radio has not been stolen and is being used in collaboration with a different accessory. Unless the thief has stolen both devices, the subsequent authentication will fail.

Moreover, in accordance with the embodiment that is compatible with APCO standards, device1 generates an authentication key by applying a function to at least a portion of ESN1 and ESN2 and a secret key stored in device1 and derives the RES using the authentication key. The complexity of the function used to generate RES depends on the level of security desired in the system and could involve a mathematical equation or algorithm or a concatenation of one or both of the ESN1 and ESN2. In one illustrative implementation, device1 includes a random number generator, which generates a random number (RAND1); and device1 calculates (406) RES as a function of ESN1, ESN2, and RAND1 (the function is illustrated in FIG. 4 as f(ESN1, ESN2, RAND1). Device1 then sends (408) RAND1 and RES to the authentication device.

The authenticator device independently determines its own authentication result, which it compares to RES to confirm (410) the RES. To confirm RES, the authenticator device self-generates an authentication result by performing a function on RAND1 (sent by the device1) and ESN1 and ESN2 (already provisioned in the authenticator device for use in authentication). If the two authentication results match, authentication is successful, which means that device1 and the authenticator device performed the same function on the same two ESNs. This further means that the authenticator device can provide a response to device1 of successful authentication for access to network 102 (e.g., for device1 and/or device2) or access to the network independent service 108 (e.g., for the user (identified by a user identification, UID) associated with the two devices). Otherwise, if the two authentication results fail to match, authentication has failed. The authenticator device, upon determining a status of authentication (successful or failed), completes the authentication process (412) by sending an authentication response to the device1, which indicates the status of authenticating the device1, device2, and/or user of the devices.

Figure 5:
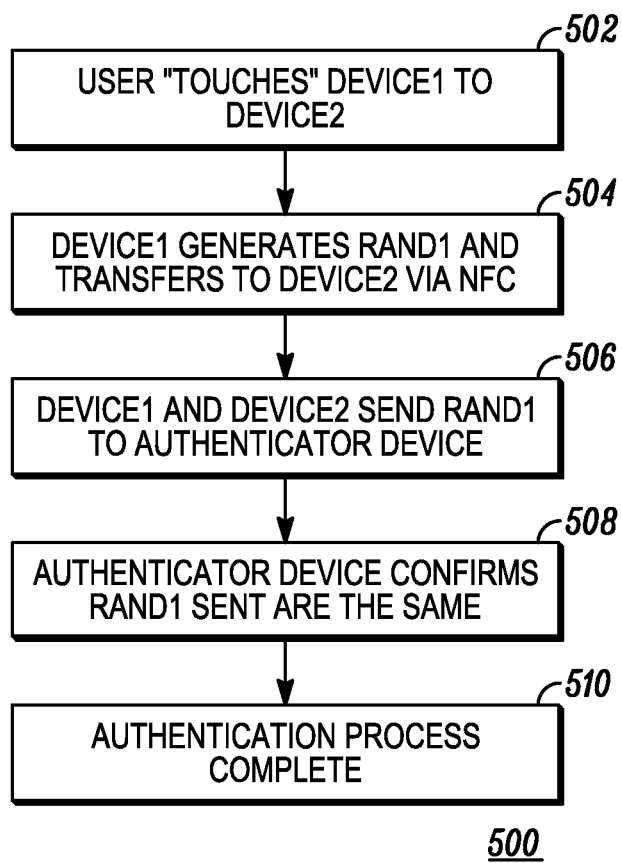
FIG. 5 is a flow diagram illustrating a method of authentication using near field in accordance with another embodiment.

FIG. 5 is a flow diagram illustrating a method 500 of authentication using near field, in accordance with a second embodiment. The functionality illustrated by reference to method 500 is performed in two devices (e.g., device 118 (also referred to as device1) and device 110 (also referred to as device2). Devices 1 and 2 are presumably operated by the same user or have a common user due to the close distance required (i.e., six inches or less) in order for data to be transferred in a near-field non-propagating signal over a near-field link between the devices.

In this embodiment, the user "touches" (502) device1 and device2. Device1 includes a random number generator, which generates (504) a random number (RAND1) that device1 sends to device2 in a near-field signal over a near-field link, which is received into the device2. Thus, the RAND1 is communicated using the near-field apparatus in the devices. Both devices 1 and 2 send (506) the same RAND1 to the authenticator device to use in authenticating one or more of device1, device2, or the user of the devices. In an illustrative implementation, device1 generates and sends the RAND1 in response to an authentication demand from the authenticator device. For instance, the authenticator device sends the authentication demand upon device1 sending a registration request to operate on the network 102 (thus the demand being initiated by device1); or the authentication demand may be initiated by authenticator device (thus the demand being unsolicited by device1).

If the authenticator device confirms (508) that the random numbers from device1 and device2 are the same, authentication is successful, e.g., for network access and/or access to a service. Otherwise, if the two random numbers fail to match, authentication has failed. The authenticator device, upon determining a status of authentication (successful or failed), completes the authentication process (510) by sending an authentication response to the device1, which indicates the status of authenticating the device1, device2, and/or user of the devices.

Figure 6:
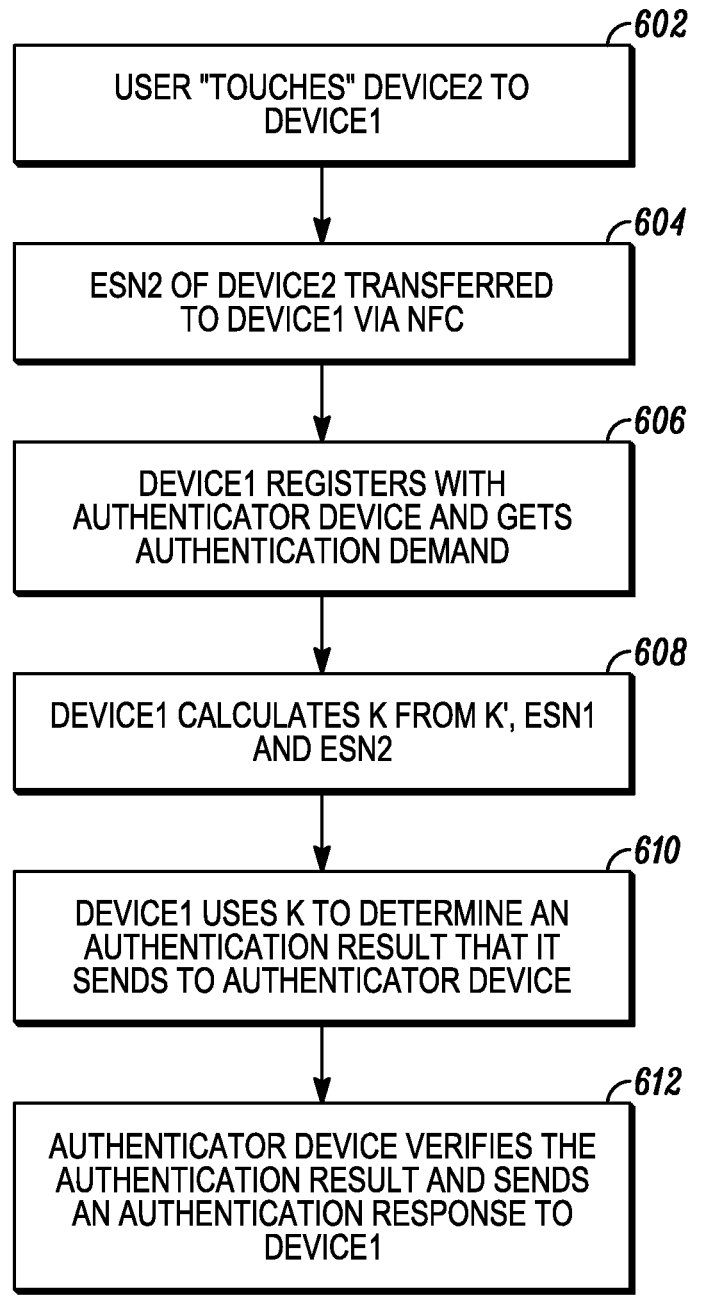
FIG. 6 is a flow diagram illustrating a method of authentication using near field in accordance with yet another embodiment.
Figure 7:
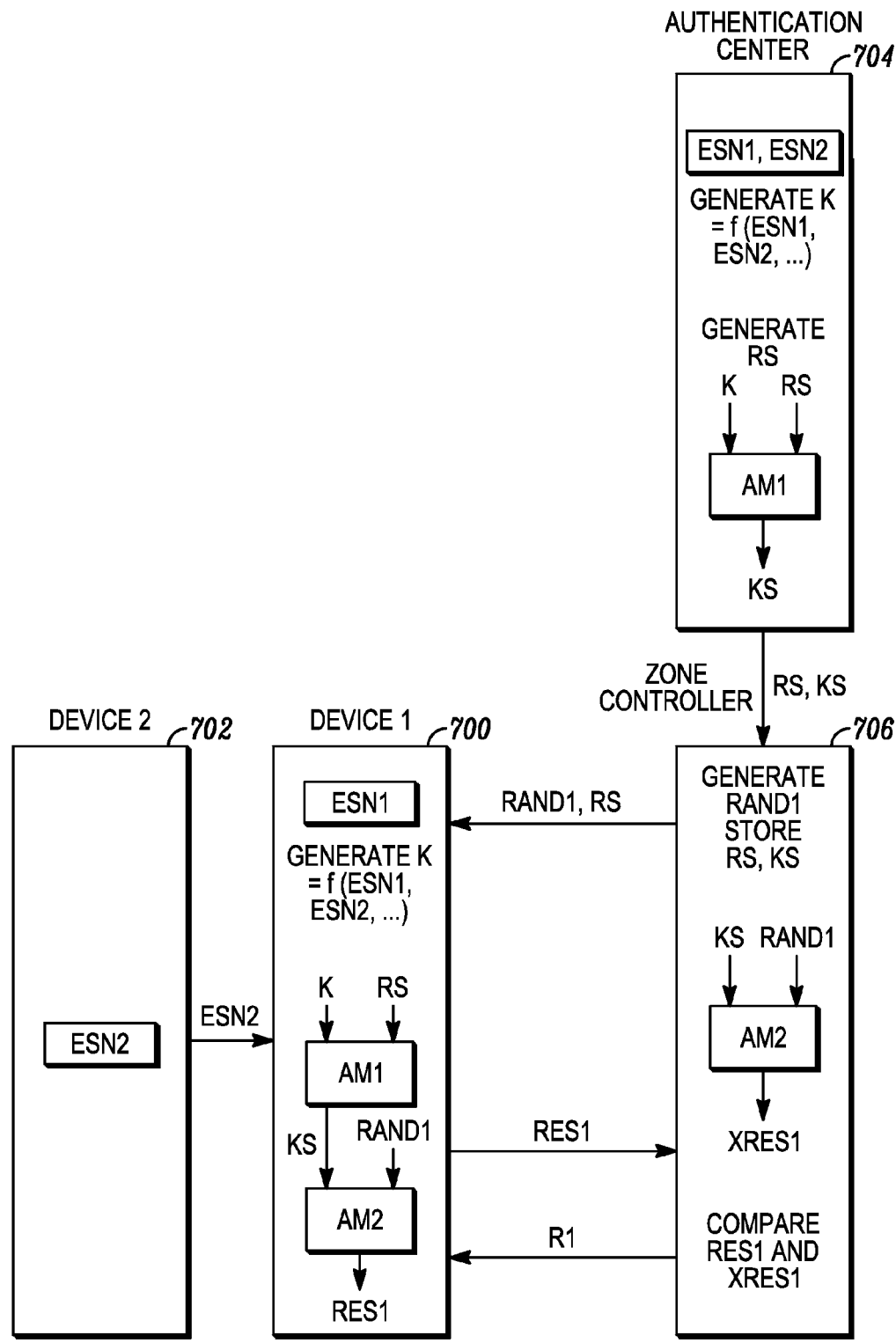
FIG. 7 is a block diagram illustrating authentication using an authentication center, a zone controller, and a device in accordance with some embodiments.

FIG. 6 is a flow diagram illustrating a method 600 of authentication using near field, in accordance with a third embodiment, which is compatible with the APCO standards. The functionality illustrated by reference to method 600 is performed in the system shown in FIG. 7, for instance. This system includes a device1 700 and a device2 702. The system further includes an authentication center (AC) 704 and a zone controller (ZC) 706 included in the infrastructure of a network (e.g., network 102). Devices 1 and 2 are presumably operated by the same user or have a common user due to the close distance required (i.e., six inches or less) in order for data to be transferred in a near-field non-propagating signal over a near-field link between the devices. Moreover, device1 is provisioned with an electronic serial number (ESN1), and device2 is provisioned with an electronic serial number (ESN2).

The AC 704 is also provisioned with the ESN1 and ESN2 to facilitate authentication in accordance with this embodiment, wherein the AC 704 and the ZC 706 effectively share the responsibilities of the "authenticator device" for enhanced protection of certain information within the infrastructure and for increased speed of the authentication process. More particularly, this embodiment uses an authentication key (K) that needs to be protected and which is, therefore, derived and stored in the AC 704. The ZC 706 receives session authentication information (SAI) from the AC 704, which is derived from K. Usually, the SAI is sent a priori to the ZC 706 well before it is needed to authenticate the device1, and the SAI is used for a predefined period of time. The ZC 706 then uses the SAI in performing real-time authentication of the device1 (as described further below) in a much faster time than could the AC 704, wherein "real-time" is meant with negligible delay.

Returning the method 600, at 602 the user "touches" device1 and device2. Upon bringing the devices into the required proximity, ESN2 from device2 is transmitted (604) to and received by device1 in a non-propagating near-field signal over the established near-field link. Thus, the ESN2 is communicated using the near-field apparatus in the devices. To obtain access to the network 102, device1 sends a registration request to register (606) with a RFSS (radio frequency sub-system) within the infrastructure of the network 102, which reaches the ZC 706. Alternatively, an unregistered device1 attempts to request a service such as, for instance, access to a particular database.

In response to the unit registration (or the service request), the ZC 706 sends an authentication demand (also referred to as a "solicited" authentication challenge) to device1. In a further implementation, at any time after a successful authentication of the device1, the authentication device can send an "unsolicited" authentication challenge, which is not in response to a request from the device 1 and is, therefore, unsolicited by device1. In the APCO embodiment, as further illustrated by reference to FIG. 7, the authentication demand comprises a random challenge (RAND1) (generated by the ZC 706 using a random number generator) and a random seed (RS). The AC 704 generates the RS using a random number generator. The AC 704 further generates a session authentication key (KS). The session RS and KS make up the SAI that the AC 704 sends to the ZC 706.

In accordance with the teachings herein, the AC 704 derives K as a function of ESN2 individually or uses some combination or function of ESN1 and ESN2. More particularly, in the APCO embodiment, K is derived as a function of ESN1 and ESN2 (with which the AC is provisioned) and a secret key (K') associated with device1. The AC 704 then inputs K and RS into a first authentication mechanism or algorithm (AM1), which outputs KS. In one illustrative implementation, K is 128 bits, RS is 80 bits, RAND1 is 40 bits, and the authentication result (RES1) is 32 bits. However, the size of these elements or the particular authentication functions used may vary without detracting from the scope of the teachings herein.

Upon receiving (606) the authentication demand that includes RAND1 and RS from the ZC 706, device1 derives (610) RES1, which it sends to the ZC 706. Particularly, in accordance with the APCO embodiment, uses a function (presumably the same functions as was used by the AC 704) to derive (608) K from ESN1, ESN2, and K', which is stored in device1. Device1 inputs K and RS into a first authentication mechanism or algorithm (presumably AM1), which outputs KS. Device1 inputs KS and RAND1 (from the ZC 706) into a second authentication mechanism or algorithm (AM2), which outputs (610) the RES1 that is sent to the ZC 706.

The ZC 706 verifies (612) the RES1 by: inputting the stored KS and the generated RAND1 into an authentication mechanism or algorithm (presumably AM2) to independently generate an authentication result (XRES); and comparing XRES to RES1 to generate an authentication response (R1), which is sent to device1. When the authentication functions (e.g., AM1 and AM2) and the ESN1 and ESN2 used in the device1 and the AC 704 and ZC 706 are the same, then the RES1 and XRES will be the same, producing a positive R1 indicating successful authentication of the device1 (and/or the device 2) to the network and/or the user for a service. Otherwise, if any element used is different indicating an unauthorized device and/or user, then R1 will be a negative response indicating failed authentication.

As mentioned above, even if R1 is positive, the ZC 706 may periodically initiate an unsolicited authentication demand to challenge authentication. In such a case, method 600 will be repeated. Instead of receiving the ESN from device2 each time an authentication demand is received, in an embodiment, the device1 stores the last ESN that it receives over the near-filed link and uses that ESN to perform the authentication method in accordance with the present teachings (e.g., method 400 or 600). If during a subsequent authentication procedure, the device1 still has stored therein the ESN2, the RES1 that it generates and sends to the ZC 706 will again match with XRES1, and R1 will indicate a successful authentication.

However, suppose that in the interim, a different device (device3) has paired with device1 and has an ESN that is other than ESN2 (i.e., ESN3). When device1 touches device3, ESN3 will be transferred to and stored in device1 to use for authentication; thus, device1 will clear ESN2 from its memory and replace it with ESN3. Accordingly, when the device1 derives the authentication response as a function of the ESN1 and the stored ESN (in this case the ESN3), the authentication result will not match the authentication result independently generated in the authenticator device, and the authentication response from the authenticator device will, therefore, indicate a failed authentication since the ESN is other than the ESN2, which is provisioned in the authenticator device.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and apparatus for the near-field wireless device pairing described herein. The non-processor circuits may include, but are not limited to, a radio receiver, a radio transmitter, signal drivers, clock circuits, power source circuits, and user input devices. As such, these functions may be interpreted as steps of a method to perform the near-field wireless device pairing described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Both the state machine and ASIC are considered herein as a "processing device" for purposes of the foregoing discussion and claim language.

Moreover, an embodiment can be implemented as a computer-readable storage element or medium having computer readable code stored thereon for programming a computer (e.g., comprising a processing device) to perform a method as described and claimed herein. Examples of such computer-readable storage elements include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method of authentication using a near-field signal, the method comprising:
   receiving, by a first device of a user having a first electronic serial number, a second electronic serial number from a second device of the user, wherein the second electronic serial number is received in a near-field signal;
   deriving, by the first device, an authentication result as a function of at least a portion of the first electronic serial number and at least a portion of the second electronic serial number; and
   sending the authentication result to an authenticator device to use in authenticating at least one of the first device, the second device, or the user of the first and second devices.

2. The method of claim 1 further comprising:
   generating a random number, wherein the authentication result is further a function of the random number; and
   sending the random number to the authenticator device to use along with the authentication result in authenticating the at least one of the first device, the second device, or the user.

3. The method of claim 1, wherein deriving the authentication result comprises:
   generating an authentication key by applying a function to the portion of the first electronic serial number, the portion of the second electronic serial number and a secret key stored in the first device and the authenticator device; and
   deriving the authentication result using the authentication key.

4. The method of claim 1, wherein the authentication result is sent in response to an authentication demand sent to the first device from the authenticator device, wherein the authentication demand is one of: responsive to a registration request sent to the authenticator device from the first device; or unsolicited by the first device.

5. The method of claim 1, wherein the first and second electronic serial numbers are provisioned in the authenticator device to enable the authenticator device to generate and send to the first device an authentication response that indicates a status of authenticating that at least one of the first device, the second device or the user, wherein the authentication response indicates a successful authentication when the authentication result matches a second authentication result independently generated by the authenticator device applying the same function to the provisioned first and second electronic serial numbers as was applied by the first device, otherwise, the authentication response indicates a failed authentication.

6. The method of claim 1, wherein the authenticating is for at least one of access to a network or access to a service.

7. The method of claim 1, wherein the near-field signal comprises a magnetic signal with limited propagation.

8. A method of authentication using near-field, the method comprising:
   a first device of a user having a first electronic serial number, performing:
      receiving an authentication demand from an authenticator device;
      receiving, from a second device of the user, a second electronic serial number that is communicated using near-field apparatus in the first and second devices;

deriving an authentication result as a function of at least a portion of the first electronic serial number and at least a portion of the second electronic serial number;

sending the authentication result to the authenticator device, wherein the first and second electronic serial numbers are provisioned in the authenticator device to enable generation of an authentication response based on the authentication result; and receiving the authentication response from the authenticator device.

9. The method of claim 8, wherein the second electronic serial number is communicated in a magnetic signal with limited propagation generated by the near-field apparatus.

10. The method of claim 8 further comprising
the first device performing:
storing an electronic serial number, for a device other than the first device, which was last received using the near field apparatus of the first device;

receiving a subsequent authentication demand from the authenticator device;

deriving a subsequent authentication result as a function of the first electronic serial number and the stored electronic serial number;

sending the subsequent authentication result to the authenticator device; and receiving a subsequent authentication response from the authenticator device, wherein the subsequent authentication response indicates a successful authentication when the stored electronic serial number is the second electronic serial number, wherein the subsequent authentication response indicates a failed authentication when the stored electronic serial number is other than the second electronic serial number.

11. The method of claim 10, the first device further performing:

storing the second electronic serial number upon receiving the second electronic serial number from the second device;

receiving, from a third device, a third electronic serial number that is communicated using near-field apparatus in the first and third devices; and replacing the second electronic serial number with the third electronic serial number, which is used to derive the subsequent authentication result that indicates failed authentication.

12. The method of claim 8, wherein receiving the authentication response comprises:

receiving a positive authentication response when the authentication result matches a second authentication result independently generated by the authenticator device applying the same function to the provisioned first and second electronic serial numbers as was applied by the first device, otherwise receiving a negative authentication response.

13. The method of claim 8, wherein the authentication demand is one of: responsive to a registration request sent to the authenticator device from the first device or initiated by the authenticator device.

14. The method of claim 8, wherein the authentication response indicates at least one of:

authentication of at least one of the first device or the second device for access to a network; or authentication of the user for access to a service.

* * * * *

UNITED STATES PATENT AND TRADEMARK OFFICE
CERTIFICATE OF CORRECTION

PATENT NO. : 8,850,196 B2
APPLICATION NO. : 12/748982
DATED : September 30, 2014
INVENTOR(S) : Alejandro G. Blanco et al.

Page 1 of 1

It is certified that error appears in the above-identified patent and that said Letters Patent is hereby corrected as shown below:

IN THE TITLE PAGE:

In Page 2, under "OTHER PUBLICATIONS," item 56, in Column 2, Line 66, delete "Confeence" and insert -- Conference --, therefor.

In Page 3, under "OTHER PUBLICATIONS," item 56, in Column 1, Line 5, delete "Attackv" and insert -- Attack --, therefor.

In Page 3, under "OTHER PUBLICATIONS," item 56, in Column 1, Line 11, delete "Communicatiions" and insert -- Communications --, therefor.

In Page 3, under "OTHER PUBLICATIONS," item 56, in Column 2, Line 8, delete "SelectedAreas" and insert -- Selected Areas --, therefor.

IN THE DRAWINGS:

In FIG. 6, Sheet 6 of 7, for Tag "602," in Lines 1-2, delete "DEVICE2 TO DEVICE1" and insert -- DEVICE1 AND DEVICE2 --, therefor.

IN THE SPECIFICATION:

In Column 4, Line 20, delete "know as" and insert -- known as --, therefor.

Signed and Sealed this
Fourteenth Day of June, 2016

Michelle K. Lee
*Director of the United States Patent and Trademark Office*